United States Patent [19]

Nagashima

[11] Patent Number: 5,671,228
[45] Date of Patent: Sep. 23, 1997

[54] SYSTEM FOR DETECTING NON-COINCIDENCE OF CODES

[75] Inventor: Noriaki Nagashima, Tokyo, Japan

[73] Assignee: NEC Corporation, Tokyo, Japan

[21] Appl. No.: 559,271

[22] Filed: Nov. 15, 1995

[30] Foreign Application Priority Data

Nov. 15, 1994 [JP] Japan .................................. 6-304220

[51] Int. Cl.⁶ .................................................. G06F 11/00
[52] U.S. Cl. ........................ 371/5.1; 371/67.1; 364/265.4; 364/258.1; 364/937.2
[58] Field of Search ............................. 371/5.1, 37.1, 371/49.1, 67.1, 68.1, 68.2, 25.1; 364/265, 265.1, 265.4, 258.1, 942.7, 943.9, 937.2, 258.4, 259.2, 488, 489

[56] References Cited

U.S. PATENT DOCUMENTS

| | | | |
|---|---|---|---|
| 5,351,245 | 9/1994 | Pregant et al. | 371/5.1 |
| 5,463,645 | 10/1995 | Nagashima | 371/67.1 |
| 5,550,837 | 8/1996 | Chang | 371/5.1 |

FOREIGN PATENT DOCUMENTS

| | | |
|---|---|---|
| 56-93452 | 7/1981 | Japan . |
| 66241 | 1/1994 | Japan . |

OTHER PUBLICATIONS

Computer System Architecture, Morris Mano, Second Edition, Prentice-Hall, Englewood Cliffs, NJ, pp. 113–116.

*Primary Examiner*—Robert W. Beausoliel, Jr.
*Assistant Examiner*—Trinh L. Tu
*Attorney, Agent, or Firm*—Sughrue, Mion, Zinn, Macpeak & Seas, PLLC

[57] ABSTRACT

Disclosed is a system for detecting non-coincidence of codes having a means for comparing an input coded signal and a predetermined coded signal to generate a non-coincidence signal including correct and error bits; a means for counting a number of the error bits included in the non-coincidence signal, thereby generating an error bit count signal for indicating the number of the error bits; and means for detecting non-coincidence between the coded signal and the predetermined coded signal by checking that the number of the error bits indicated by the error bit count signal is greater or equal to a predetermined error number.

12 Claims, 6 Drawing Sheets

SYSTEM FOR DETECTING NON-COINCIDENCE OF CODES

FIELD OF THE INVENTION

This invention relates to a system for detecting non-incidence of codes, and more particularly to, a system in which the number of error bits in a coded signal is detected as to whether it is greater than or equal to a predetermined error number.

BACKGROUND OF THE INVENTION

One type of a conventional system for detecting non-coincidence of codes, which is disclosed in Japanese patent application laid-open No.56-93452, includes an exclusive OR circuit for detecting non-coincidence of two corresponding bits between an input coded signal and a predetermined coded signal, a ROM for storing all codes with various bits which correspond to the number of error bits, and a comparator for comparing the number of error bits with a number representing a predetermined tolerable errors inputted in a digital switch.

In operation, the input coded signal and a predetermined coded signal are supplied to the exclusive OR circuit to detect non-coincidence therebetween and give logical value "1" only to a non-coincidence bit, then ROM receives an output coded signal of the non-coincidence code to determine a number of error bits. The number of error bits is compared with the number representing a predetermined number of tolerable errors in the digital switch to decide whether it is an error code.

Another type of a conventional system for detecting non-coincidence of codes, which is disclosed in Japanese patent application laid-open No.6-6241, includes a non-coincidence detecting circuit for detecting non-coincidence of each two bits between an input coded signal and a predetermined coded signal, a plurality of residual error bit detecting circuits for decreasing residual error bits by one bit, and a coincidence detecting circuit for detecting the coincidence between the input coded signal and the predetermined coded signal to provide a coincidence signal.

In operation, the input coded signal and a predetermined coded signal are supplied to the exclusive OR circuit to detect non-coincidence therebetween and give logical value "1" only to a non-coincidence bit, then each of the plurality of residual error bit detecting circuits serves to decrease the residual error bits detected at the exclusive OR circuit by one bit. The coincidence detecting circuit provides a coincidence signal when detecting the non-existence of an error bit from the final residual error bit detecting circuit.

Another type of a conventional system for detecting non-coincidence of codes includes a non-coincidence detecting circuit for detecting non-coincidence of each two bits between an input coded signal and a predetermined coded signal, a shift register for storing the detected results of the non-coincidence in each bit of the input coded signal, and a counter for counting the number of bits which are determined to be non-coincided.

In operation, the input coded signal is compared in the non-coincidence detecting circuit with the predetermined coded signal bit by bit, so that the detected results of high and low level signals are generated in accordance with the non-coincidence and the coincidence of each two bits between the input and predetermined coded signals. The high and low level signals are stored in the shift register and supplied in series to an AND gate for permitting clock signals to be supplied to the counter, in which the number of the high level signal is counted. When the counted number is less than or equal to a number representing a predetermined number of tolerable errors in the counter, the input coded signal is determined to be correct, even if the input coded signal includes errors in some bits.

However, there are disadvantages in the conventional systems for detecting non-coincidence of codes in that:

(1) in the first conventional system(JP56-93452), the more the number of bits of an input code is, the larger the capacity of the ROM required to store the error number corresponding to all error bit codes;

(2) in the second conventional system(JP6-6241), the scale of the system becomes large and the detection time becomes long, corresponding to the increase in the number of tolerable error bits, and (3) in the third conventional system, the detection time becomes relatively long; because the detected results are supplied in series from the shift register to the AND gate.

SUMMARY OF THE INVENTION

Accordingly, it is an object of the invention to provide a system for detecting non-coincidence of codes in which a time for detecting non-coincidence between an input coded signal and a predetermined coded signal is short.

It is a further object of the invention to provide a system for detecting non-coincidence of codes in which the scale of the system is minimized.

According to the invention, a system for detecting non-coincidence of codes, comprises:

means for comparing an input coded signal having a plurality of bits and a predetermined coded signal to generate a non-coincidence signal having a plurality of bits, each bit of the predetermined coded signal corresponding to a different bit of the input coded signal to form a corresponding bit pair for comparison on a bit-by-bit basis including correct and error bits for each corresponding bit pair compared;

means for counting a plurality of the correct and error bits to determine a number of the error bits included in the non-coincidence signal and thereby generating an error bit count signal for indicating the number of the error bits included in the non-coincidence signal; and means for detecting non-coincidence between the input coded signal and the predetermined coded signal by checking that the number of the error bits indicated by the error bit count signal is greater than or equal to a number representing a predetermined number of tolerable errors.

BRIEF DESCRIPTION OF THE DRAWINGS

The invention will be explained in more detail in conjunction with the appended drawings, wherein.

DESCRIPTION OF THE PREFERRED EMBODIMENTS

Before explaining a system for detecting non-coincidence of codes in a preferred embodiment, the aforementioned conventional systems will be explained with reference to FIGS. 1 to 3.

Figure 1:
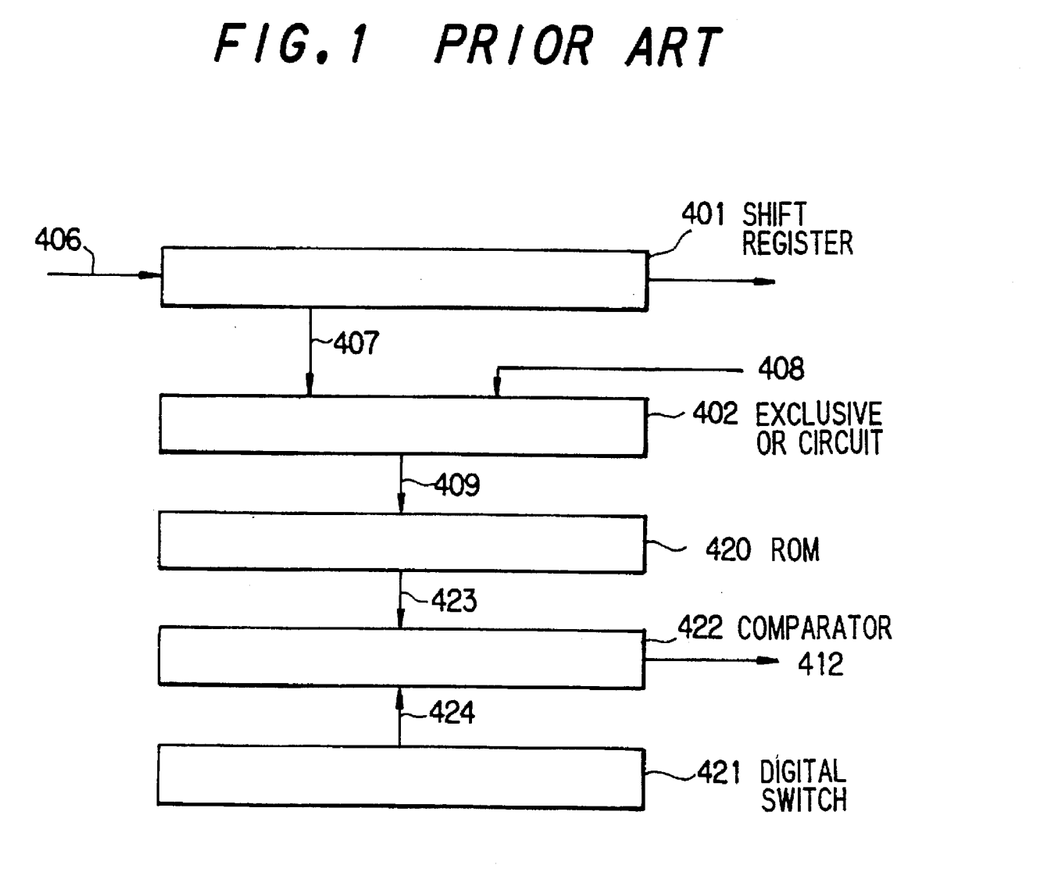
FIG. 1 is a block diagram showing a conventional system for detecting non-coincidence of codes.

FIG. 1 shows the first conventional system(JP56-93452) which includes a shift register 401, an exclusive OR circuit 402, a ROM 420, a comparator 422, and a digital switch 421.

In operation, a serial input data 406 is first converted into parallel data with given number of bits by the shift register 401. The parallel data from the shift register 401 and a predetermined coded signal 408 are supplied to the exclusive OR circuit 402 in which a logical value "1" is assigned only to a bit of non-coincidence. Then, the ROM 420 which stores output coded signal 409 which includes all codes with various bits including logical value "1" output from the exclusive OR circuit 402. The ROM 402 outputs a numeral value 423 corresponding to the number of coincidence codes in the output coded signal 409. The output 403 from the ROM 420 and an output value from the digital switch 421 indicating a predetermined number of tolerable non-coincidence errors, are compared at the comparator 422 to detect whether the number of non-coincidence codes is less than predetermined number of tolerable non-coincidence errors.

Figure 2:
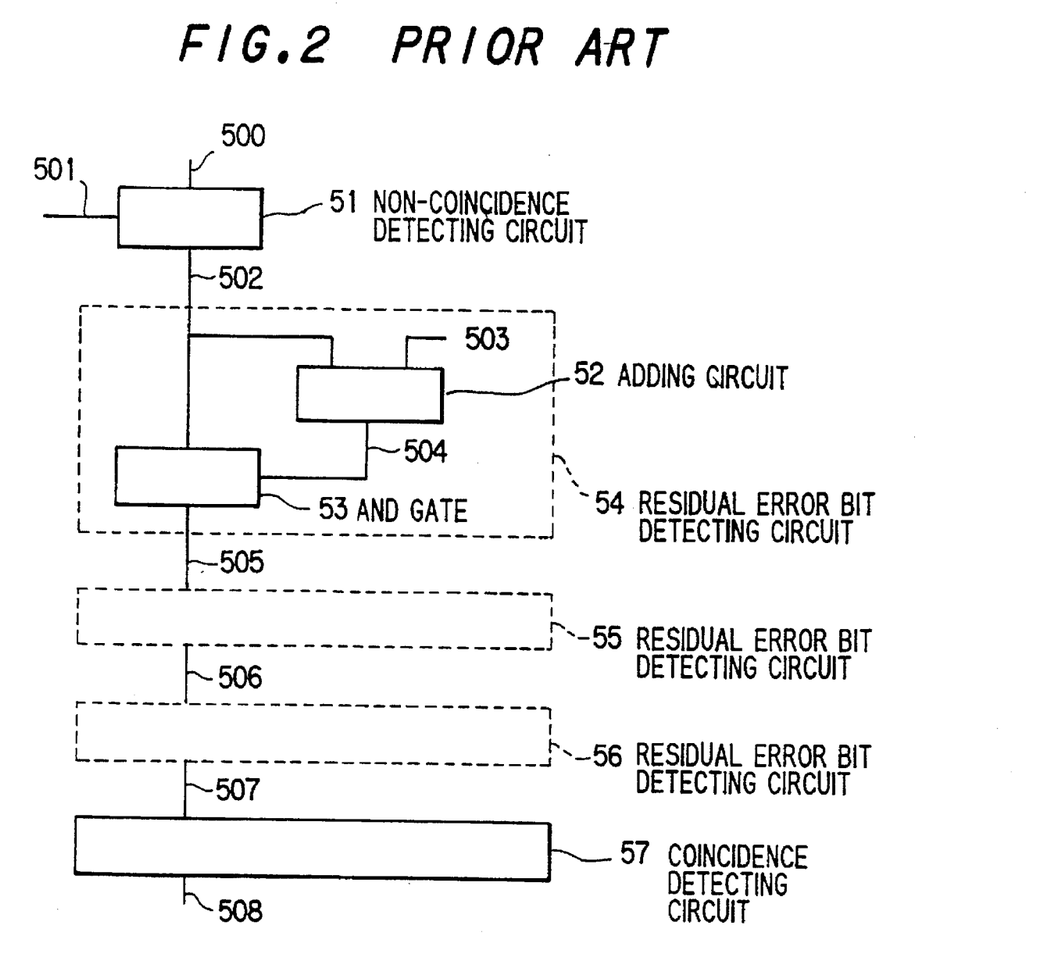
FIG. 2 is a block diagram showing another conventional system for detecting non-coincidence of codes.

FIG. 2 shows the second conventional system(JP6-6241) which includes a non-coincidence detecting circuit 51; a plurality of residual error bit detecting circuits 54 to 56, each including an adding circuit 52 and AND gate 53;, and a coincidence detecting circuit 57 The number of residual error bit detecting circuits in the conventional system of FIG. 2 corresponds to a predetermined number N of tolerable non-coincidence errors.

In operation, an input coded signal 501 and a predetermined coded signal 500 are supplied to the non-coincidence detecting circuit 51 (which is equivalent to the exclusive OR circuit 402 in FIG. 1) in which a logical value "1" is assigned only to the bit of non-coincidence. Each of the residual error bit detecting circuits 54 to 56 cancels one bit with the logical value "1", i.e., each residual error bit detecting circuit converts a bit with the logical value "1" to a bit with logical value "0". The data from the residual error bit detecting circuits is inputted to the coincidence detecting circuit 57 to detect whether the data includes the logical value "1".

Figure 3:
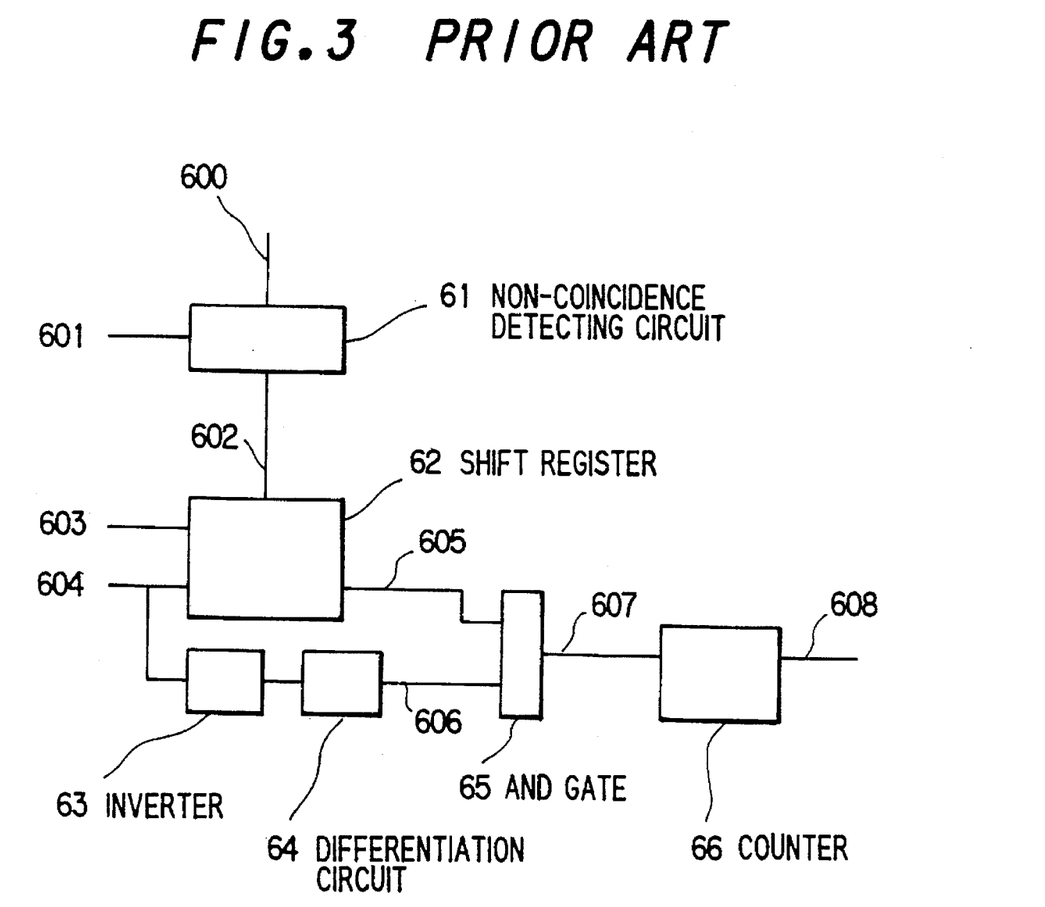
FIG. 3 is a block diagram showing another conventional system for detecting non-coincidence of codes.

FIG. 3 shows the third conventional system which includes a non-coincidence detecting circuit 61, a shift register 62, an inverter 63, a differentiation circuit 64, an AND gate 65, and a counter 66.

In operation, a predetermined coded signal 600 and an input coded signal 601 are supplied to the non-coincidence detecting circuit 61, in which exclusive OR process is carried out between each two corresponding bits of the input and predetermined coded signals, so that a high level signal is generated when the two bits are coincident a low level signal is generated when the two bits are not coincident. The high and low level signals are transferred via a signal line 602 to the shift register 62 by a load signal supplied to a control line 603. The shift register 62 supplies the AND gate 65 via a signal line 605 with the high and low level signals in series in accordance with a clock signal supplied to a clock line 604. The clock signal is inverted in the inverter 63, and the inverted signal is differentiated in the differentiation circuit 64 to be a pulse signal which is then supplied to the AND gate 65 via the signal line 606. Thus, the pulse signal is supplied via the AND gate 65 and a signal line 607 to be counted in the counter 66, when the high level signal is supplied from the shift register 62 to the AND gate 65. When the counted number becomes more than a predetermined number of tolerable non-coincidence errors, a signal representing the non-coincidence between the input and predetermined coded signals is obtained at a signal line 608 connected to the counter 66.

Next, a system for detecting non-coincidence of codes in the first preferred embodiment will be explained in FIGS. 4A to 6.

Figure 4A:
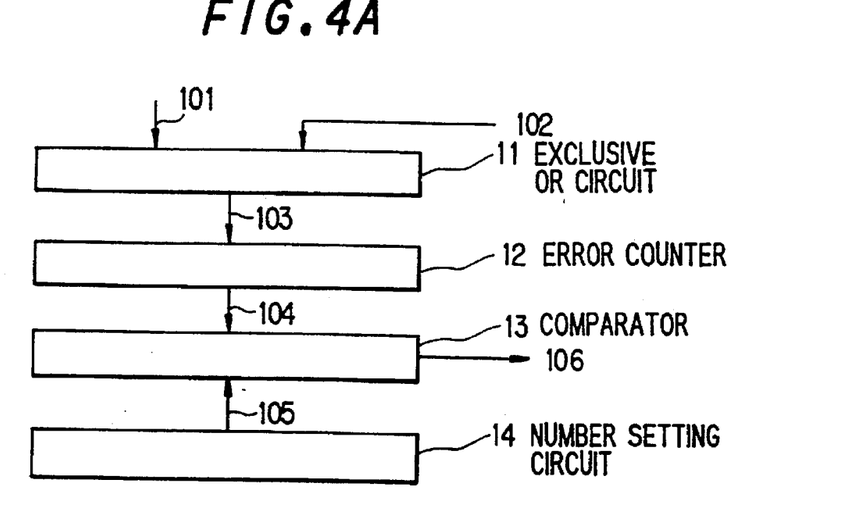
FIG. 4A is a block diagram showing a system for detecting non-coincidence of codes in a preferred embodiment according the invention.

FIG. 4A shows the system for detecting non-coincidence of codes which comprises: an exclusive OR circuit 11 for conducting an exclusive OR operation on a bit-by-bit basis between an input coded signal on a signal line 101 and a predetermined coded signal on a signal line 102 to output a non-coincidence signal with a logical value "1" on a signal line 103 only when non-coincidence occurs therebetween; an error counter 12 for counting a number of non-coincidence signals having a logical value "1" inputted from the signal line 103 and outputting the count number through a signal line 104; a comparator 13 for comparing between the count number on the signal line 104 and a given number on a signal line 105 and outputting a coincidence signal on a signal line 106 when the count number is less than or equal to the given number on the signal line 105; and a number setting circuit 14 for setting a given tolerable number of non-coincidence errors by means of a dipswitch, flip-flop etc.

Figure 5:
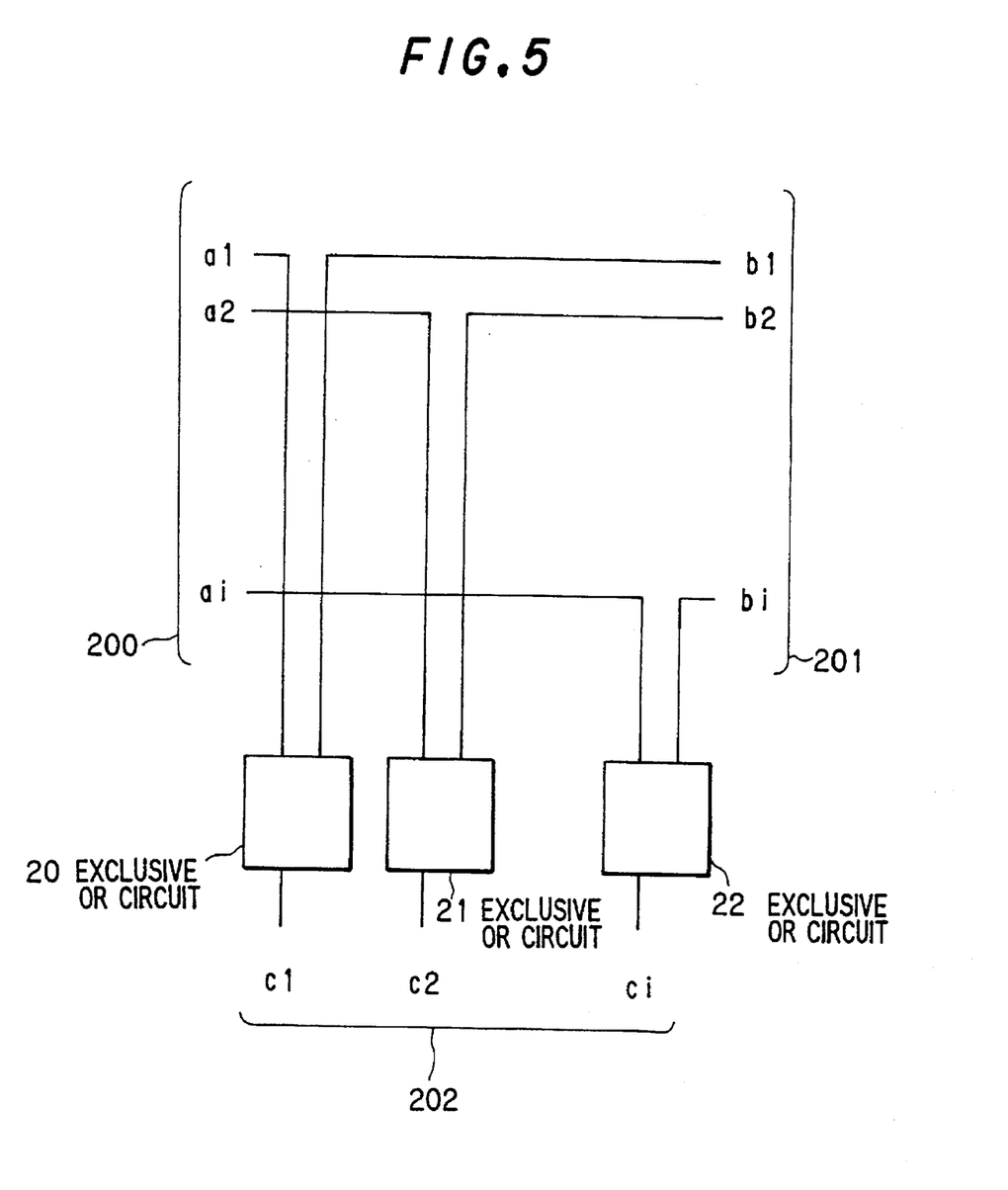
FIG. 5 is a block diagram showing an example of an exclusive OR circuit in FIG. 4A.

Herein, as shown in FIG. 5, the exclusive OR circuit 11 may be a unit 202 which comprises a plurality of exclusive OR circuits 20, 21, . . . , 22 (having output lines c1, c2, . . . , ci, respectively)which correspond to the number i of bits included in the input coded signal to conduct an exclusive OR operation on a bit-by-bit basis between an input coded signal 200 having a plurality of bits a1, a2, . . . , ai and a predetermined coded signal 201 having a plurality of bits b1, b2, . . . , bi. For example, the number i is 16 in this embodiment. Depending on the number i, the detailed structure of the error counter 12 as shown in FIG. 6 may be altered.

Figure 4B:
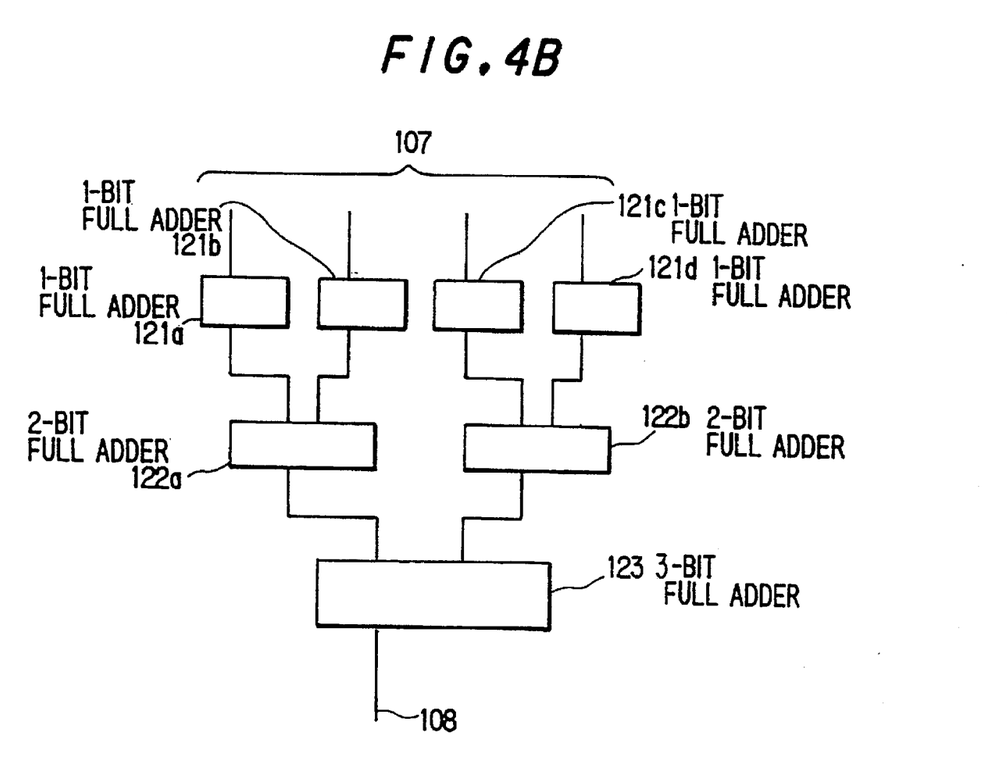
FIG. 4B is a block diagram showing an example of an error counter 12 in FIG. 4A.

On the other hand, the error counter 12 may comprise a plurality of adding circuits which have a hierarchical structure. For example, as shown in FIG. 4B, it may comprise four 1-bit full adders 121a–121d on the first step, two 2-bit full adders 122a–122b on the second step and a 3-bit full adder 123 on the final step.

Figure 6:
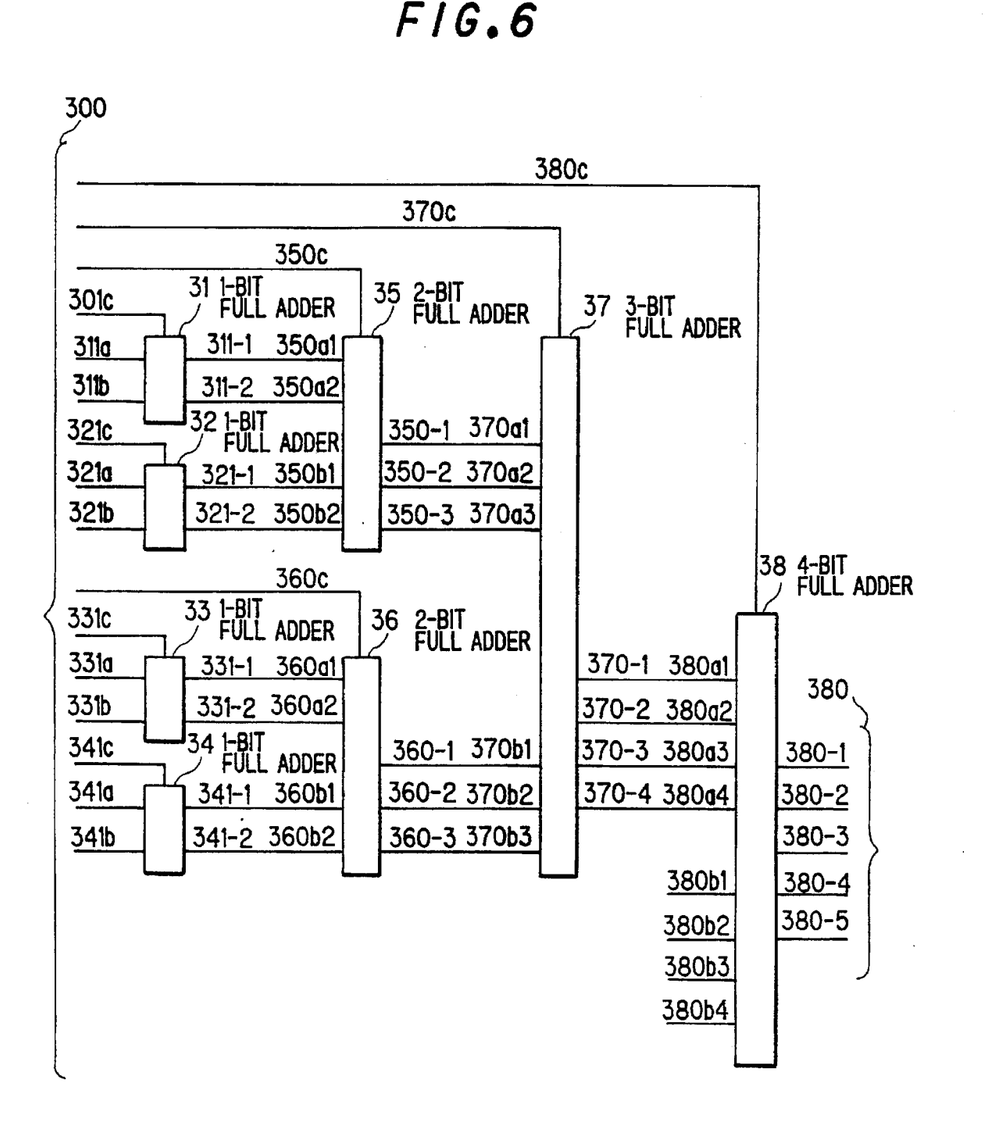
FIG. 6 is a block diagram showing another example of an error counter in FIG. 4A.

FIG. 6 shows in detail the error counter 12. Herein, a suffix a or b means an input signal to an adder, a suffix c means carrying input signal to an adder, the number having a hyphen, such as 311-1, means an output signal from an adder, and the number following a suffix or hyphen means a bit location of an input to an output from an adder.

In FIG. 6, 16 bits through a signal line 300 (corresponding to the output signal line 103 from the exclusive OR circuit 12 in FIG. 4A) are inputted bit by bit to respective 1-bit full adders 31 to 34 through input signal lines 311a to 341b and respective full adders 35 to 38 through carrying input signal lines 350c to 380c. Hereon, the order of inputting the signal bits to the respective full adders through the signal line 300 may be optionally selected.

Each of the 1-bit full adders 31 to 34 outputs a 2-bit signal which corresponds to a number 0 to 3 obtained by summing a logical value "1" which may be included in the input signals 311a to 341b. Next, the respective two 2-bit signals from the 1-bit full adders 31, 32 or 33, 34 are inputted to a 2-bit full adder 35 or 36. Then, the 2-bit full adder 35 or 36 sums the number included in two 2-bit signals with adding a logical value "1" which may be included in the carrying input signal 350c or 360c and outputs a 3-bit signal. The two 3-bit signals from the 2-bit full adders 35 and 36 are inputted to a 3-bit full adder 37. Then, the 3-bit full adder 37 sums the number included in the two 3-bit signals with adding a logical value "1" which may be included in the carrying input signal 370c and outputs a 4-bit signal. The 4-bit signal is inputted to a 4-bit full adder 38(no input from input lines 380b1–b4) which sums the number included in the 4-bit signal with adding a logical value "1" which may be included in the carrying input signal 380c. Herein, the carrying input signals 350c, 360c, 370c and 380c are distributed as a part of the signal line 300.

As explained above, the error counter 12 which comprises a plurality of full adders sums the number of non-coincidence signals with a logical value "1" included in the input signal through the signal line 103 and outputs the summed number to the comparator 13 through the signal line 104.

In this embodiment, a delay time taken between the input through the signal line 101 and the output on the signal line 106 is very short because the circuits 11 to 13 are comprised of a relatively simple logical circuits with few steps.

Meanwhile, this embodiment is directed to a tolerable error number of 16, i.e., maximum error number in an input coded signal with 16 bits. When the number of bits in an input coded signal is changed, the number of steps included in the error counter 12 may be altered.

Although the invention has been described with respect to specific embodiment for complete and clear disclosure, the appended claims are not to be thus limited but are to be construed as embodying all modifications and alternative constructions that may be occur to one skilled in the art which fairly fall within the basic teaching herein set forth.

What is claimed is:

1. A system for detecting non-coincidence of codes, comprising:

means for comparing an input coded signal having a plurality of bits and a predetermined coded signal having a plurality of bits, each bit of the predetermined coded signal corresponding to a different bit of said input coded signal to form a corresponding bit pair for comparison on a bit-by-bit basis to generate a non-coincidence signal including correct and error bits for each corresponding bit pair compared;

means for counting a plurality of said correct and error bits to determine a number of said error bits included in said non-coincidence signal, thereby generating an error bit count signal for indicating said number of said error bits included in said non-coincidence signal, said means for counting comprising a plurality of adding circuits having a hierarchical configuration; and means for detecting non-coincidence between said input coded signal and said predetermined coded signal by checking that said number of said error bits indicated by said error bit count signal is greater than or equal to a predetermined number of tolerable errors.

2. A system for detecting non-coincidence of codes, according to claim 1, wherein:
    said adding circuits are full adders.

3. A system for detecting non-coincidence of codes, according to claim 1, wherein:
    each of said adding circuits is configured to add at least two numbers, each of said at least two numbers having one to four bits.

4. A system for detecting non-coincidence of codes, according to claim 1, wherein:
    at least one of said adding circuits is connected with a carrying input signal line on which at least one of said error bits included in said non-coincidence signal is distributed.

5. A system for detecting non-coincidence of codes, according to claim 1, wherein said comparing means simultaneously compares more than one corresponding bit pair.

6. A system for detecting the non-coincidence of codes, according to claim 1, wherein said comparator includes an exclusive OR circuit.

7. A system for detecting non-coincidence of codes, comprising:

first comparator for comparing an input coded signal having a plurality of bits, and a predetermined coded signal having a plurality of bits, each bit of the predetermined coded signal corresponding to a different bit of said input coded signal to form a corresponding bit pair for comparison on a bit-by-bit basis, said first comparator generating a non-coincidence signal including correct and error bits for each corresponding bit pair compared;

a counter for counting a plurality of said correct and error bits to determine a number of said error bits included in said non-coincidence signal, thereby generating an error bit count signal for indicating said number of error bits included in said non-coincidence signal, said counter comprising a plurality of adding circuits having a hierarchical configuration; and a second comparator for determining if said number of said error bits indicated by said error bit count signal is greater than or equal to a predetermined number of tolerable errors.

8. A system for detecting the non-coincidence of codes, according to claim 7, wherein said first comparator includes an exclusive OR circuit.

9. A system for detecting the non-coincidence of codes according to claim 7, wherein each of said adding circuits is a full adder.

10. A system for detecting the non-coincidence of codes according to claim 7, wherein each of said adding circuits is configured to add at least two numbers, each of said at least two numbers having one to four bits.

11. A system for detecting the non-coincidence of codes according to claim 7, wherein:
    at least one of said adding circuits is connected with a carrying input signal line on which at least one of said error bits included in said non-coincidence signal is distributed.

12. A system for detecting non-coincidence of codes, according to claim 7, wherein said first comparator simultaneously compares more than one corresponding bit pair.

* * * * *

UNITED STATES PATENT AND TRADEMARK OFFICE
CERTIFICATE OF CORRECTION

PATENT NO.   : 5,671,228
DATED        : September 23, 1997
INVENTOR(S)  : Noriaki Nagashima It is certified that error(s) appears in the above-identified patent and that said Letters Patent is hereby corrected as shown below:

Column 2, line 33, after "signal" insert --having a plurality of bits, each bit corresponding to a different bit of the input coded signal to form a corresponding bit pair for a comparison on a bit-by-bit basis--.

Column 2, lines 33-38, delete "having . . . bit-by-bit basis".

Column 3, line 25, delete "403" and insert --423--.

Signed and Sealed this

Twenty-seventh Day of January, 1998

Attest:

BRUCE LEHMAN

*Attesting Officer*           *Commissioner of Patents and Trademarks*